United States Patent
Kattainen et al.

(10) Patent No.: US 10,472,208 B2
(45) Date of Patent: Nov. 12, 2019

(54) METHOD OF ELIMINATING A JERK ARISING BY ACCELERATING AN ELEVATOR CAR

(71) Applicants: Ari Kattainen, Hyvinkaeae (FI); Kenneth Kronkvist, Vantaa (FI); Giovanni Hawkins, Helsinki (FI)

(72) Inventors: Ari Kattainen, Hyvinkaeae (FI); Kenneth Kronkvist, Vantaa (FI); Giovanni Hawkins, Helsinki (FI)

(73) Assignee: Kone Corporation, Helsinki (FI)

( * ) Notice: Subject to any disclaimer, the term of this patent is extended or adjusted under 35 U.S.C. 154(b) by 333 days.

(21) Appl. No.: 14/984,298

(22) Filed: Dec. 30, 2015

(65) Prior Publication Data
US 2016/0214833 A1 Jul. 28, 2016

(30) Foreign Application Priority Data
Jan. 26, 2015 (EP) .................................. 15152437

(51) Int. Cl.
*B66B 5/00* (2006.01)
*B66B 1/30* (2006.01)
*G01P 15/00* (2006.01)

(52) U.S. Cl.
CPC ............ *B66B 5/0037* (2013.01); *B66B 1/304* (2013.01); *B66B 5/0018* (2013.01); *G01P 15/00* (2013.01)

(58) Field of Classification Search
CPC ........ B66B 1/304; B66B 5/0018; G01P 15/00
See application file for complete search history.

(56) References Cited

U.S. PATENT DOCUMENTS

| 5,635,688 A | * | 6/1997 | Kantesaria | B66B 1/28 187/292 |
| 2005/0077117 A1 | * | 4/2005 | Shrum, III | B66B 5/0037 187/393 |
| 2009/0152053 A1 | | 6/2009 | Smith et al. | |
| 2010/0140023 A1 | * | 6/2010 | Fukui | B66B 5/02 187/292 |
| 2011/0011681 A1 | * | 1/2011 | Kondo | B66B 1/32 187/247 |
| 2012/0073909 A1 | * | 3/2012 | Kondo | B66B 1/32 187/247 |
| 2013/0292210 A1 | | 11/2013 | Smith et al. | |
| 2014/0000985 A1 | * | 1/2014 | Fukui | B66B 5/0031 187/247 |

OTHER PUBLICATIONS

European Search Report for European Application No. 15152437.8 dated Aug. 7, 2013.

* cited by examiner

*Primary Examiner* — Matthew G Marini
(74) *Attorney, Agent, or Firm* — Harness, Dickey & Pierce, P.L.C.

(57) ABSTRACT

The invention concerns the automatically detection and analysis of jerks arising when an elevator car starts its ride carrying out a determination of an elevator run sequence by an elevator controller, measuring an elevator car movement with a sensor at a predetermined phase of the elevator run sequence, and determining an elevator car sway from the sensor data, further comparing the determination result with a pre-set criteria, and being followed by outputting the comparison result.

13 Claims, 1 Drawing Sheet

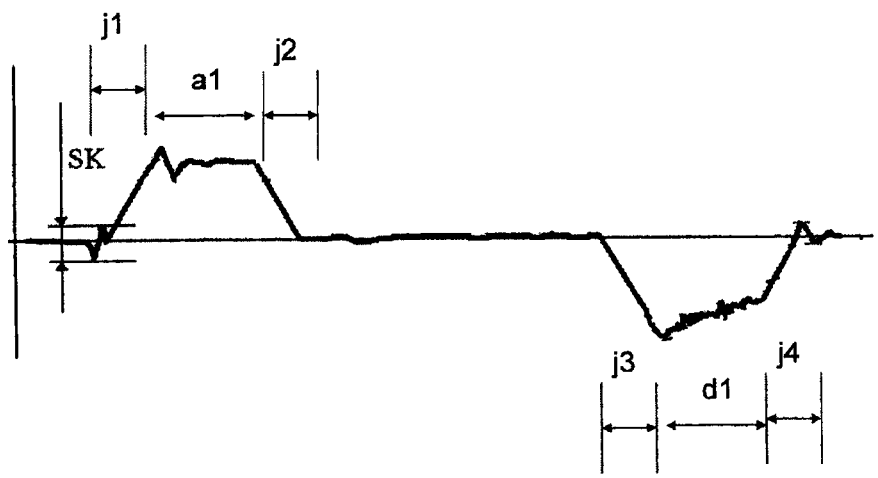

METHOD OF ELIMINATING A JERK ARISING BY ACCELERATING AN ELEVATOR CAR

This application claims priority to European Patent Application No. 15152437.8 filed on Jan. 26, 2015, the entire contents of which are incorporated herein by reference.

FIELD OF THE INVENTION

The present invention relates to get an unwanted sudden jerk under control being felt when starting or even terminating an elevator ride. A special type of such jerk is the one arising in the starting phase of acceleration which is then called "start kick".

BACKGROUND OF THE INVENTION

The ride comfort of elevators is an important item being encountered in modern elevator technology. Improving the ride comfort does also mean to diminish the jerks the physical unit of it relating to the variation of acceleration and thus measured in [$m/s^3$]. Jerks are being felt when the car or cabin starts or terminates its movement. A start kick as a special kind of such jerk can be felt at the beginning of a run. The jerking is due to a combination of many factors, like the cooperation of interacting elements or an error in the elevator car load weight measurement, etc. So, every implementation of an elevator in a building means an individual context and coherence of its compounds in view of their causation. The acceleration and deceleration jerks are directly felt by the elevator user on the car-floor and therefore can be measured by installing an auditing tool on the floor during the time of measuring phase. Such a tool comprises a vibration or sound sensor the data of which are analysed by the aid of a vibration analysis software. Problems with the above mentioned error in a load measurement or with roller guides, rail joints, motor control systems and other dynamic elements can be thus identified in minutes. However, to recognise and measure the start kick by commercial ride comfort analysers is difficult and requires experience due to that knowledge about the specific elevator starting sequence is needed like door closing or details of the start of run, etc. Additionally, the known tools do not know the sequencing of the elevator at all and therefore are not able to separate start kicks from some other random vibration peaks.

SUMMARY

The object of the invention is to diminish the problems in prior art and to disclose a convenient method for getting said jerks under control.

The above object is achieved by a method and/or a computer readable medium having stored the computer program conveniently integrated into the elevator control system.

Basic idea of the invention is to embed an automatic detection appliance into an elevator control system to automatically detect and analyse jerks, especially arising when an elevator car starts its ride. To this end, the invention realizes to take details of start sequence signals of the respective drive into account for said analysis.

BRIEF DESCRIPTION OF THE DRAWINGS

These and/or other aspects will become apparent and more readily appreciated from the following description of example embodiments, taken in conjunction with the accompanying drawings of which:

FIG. 1 shows an example of an acceleration graph.

DETAILED DESCRIPTION

A convenient start sequence includes for example the following phases:
1. A DC current (according to the elevator car load weight measurement) is fed to the hoisting motor to hold the car standstill against unbalance of the load;
2. Hoisting machinery brakes are opened and the car is kept in standstill with the DC current;
3. Velocity is increased softly from zero (with slowly increasing acceleration) until acceleration reaches an allowed maximum, e.g. 1 $m/s^2$; after this the velocity is increased linearly;
4. When the velocity approaches the allowed maximum velocity, acceleration is decreased slowly to zero such that the elevator car finally runs with a constant maximum velocity;
5. When the elevator car approaches a destination floor, the car speed is softly reduced to zero such that the above phases 4-1 are performed in reverse order.

The above sequence is controlled with a state machine in a software of the elevator control unit or elevator drive, e.g. including a frequency converter. An unwanted start kick is detectable at least in phase 2, when the brakes are opened—wherein a start kick detection may also continue at the beginning of phase 3, because this phase starts very fast after phase 2. FIG. 1 shows a devolution of acceleration revealing also the jerks and especially a start kick.

As a sensor for detecting the start kick jerk one or several of the following devices can operate measuring any movement of the car or that of the traction sheave: motor encoder; KCE (=KONE® controller and Electrification) Door Zone Sensor for linear position; sensor or Z-direction accelerometer placed in the car—for example as a KCEDZS (=KONE® controller and Electrification Door Zone Sensor) being a measuring device mounted to an elevator car and configured to read stationary position references mounted in the elevator shaft. The position references are disposed such that the measurement device gets a reading when the elevator car is at the door zone, e.g. the position that elevator passengers can enter/exit the car. The measurement device gets a linear position reading for an about 30 cm area around the door zone. From this reading a car velocity and its acceleration and a jerk may be calculated for determining the start kick in question. Another possibility is to measure the deviation of the position and/or speed and/or the acceleration from what is the desired value; the desired value can be obtained from an elevator car velocity reference (target value of the elevator car speed control). Analytical capabilities include a time history zoom being expanded with data measurement, elevator travel time measurement, comparison of data with respect to user imposed vibration limits, spectral analysis (FFT), and RMS vibration and sound level measurement (A-weighted, fast response).

Said vibration measurements are processed then to get a start kick magnitude, e.g. amplitude and direction of sway. This is done in that the measurement and/or sampling of the sway is started at certain predefined points in the state machine software and then stopped at another predefined point in said state machine software, and the sampled data is memorized. Then the aforementioned amplitude/direction of sway is/are calculated from the memorized sampled data. The measured acceleration at preselected start sequence phase is then compared with threshold values. Based on the comparison non-desired start kicks are determined and the result is reported and/or fed to a corrector.

Alternatively this result may be compared with some ride comfort criteria to get a standardized quality value that can be communicated. Taking into account that the ride quality refers to only a part of the recorded signals detected by the vibration and sound sensor, a convenient analysis of the data delivered by a sensor is made according to a preferred embodiment of the invention. This means filtering of those vibration and sound data that people actually do feel or hear. Probably the most powerful tool for diagnosing problems for it is the Fourier transformation. This allows the vibration to be analysed with respect to its frequency content. For example, 6 inch roller guides on a 2.5 m/s elevator will rotate about 5.3 times per second (5.3 Hz). If roller guides are creating a significant level of vibration, then this will show up in the spectrum (vibration level versus frequency) of the signal. The standard ISO2631 shows an experimental research evaluation of the vibration exposure for the health risk prediction during vehicle operation.

According to a convenient embodiment a ride comfort criteria can be established as an analysis algorithm. The calculation of it is then carried out by a software program which is conveniently associated with the state machine of an elevator drive software. The algorithm software can be embedded on the CPU of the lift controller like KCE device or as software of the drive CPU. Such combination enables to get sufficient information being available to make the determination at an exactly right moment of the elevator starting sequence. The lift controller determines the elevator run sequence and evaluates the start kick based on the run sequence. In the result thereof, the start kick detector thus embedded in the control system detects and reports start kicks according to the specified elevator performance class. Different ride comfort classes do have different acceptable start kick values.

The algorithm can be started from a signal which enables the drive and brake controller. In case of a KCE-sensor this is called main-safety-output. It combines the sequencing information from the elevator controller with the calculated or measured car acceleration spikes from either one of the above mentioned sensors. The algorithm can be stopped as soon as a known jerk rate starts being defined by drive parameters, meaning that the known jerk rate starts at a predefined point in state machine software, i.e. the start sequence of an elevator run has proceeded to a point in which the start kick has ended and the elevator car accelerates towards a maximum constant speed.

Subsequently to the detection and analysis a correction of the start kick is followed which can be done by a serviceman or even also automatically. By means of this, an embedded start kick detection is very helpful to improve the installation quality as a direct feedback from controller to installer.

When the correcting measures are taken by a serviceman a possibility would be to change one or several drive control parameters, to change scaling or an offset of an elevator load weight measurement signal or to change the torque feedforward of the motor what means the current value supplied to the motor at the beginning of the elevator run, when the machinery brakes are opened. To this end, the analysis of the start kick determinator program is then conveniently realized such that the program suggests the serviceman what parameters should be changed and how much. A possibility would be to do the start kick removal procedure remotely from a service centre via remote link. The information being provided for the installer during commissioning will assist the installer and can be used as a condition monitoring tool during the life time of the elevator. The start kick value can be reported to the installer or serviceman for adjusting the same via KCE maintenance user interfaces. Alternatively or additionally the start kick value can be reported to the service centre via KRM systems. Specified or sold ride comfort classes can be communicated from sales organisation to KCE controller via SAP system as part of delivery parameters.

In case the start value changes over the time a trend can be evaluated which in turn can be used to estimate the need for the next service visit.

As a best mode one could exemplary fix the following implementation: The elevator system in question comprises a hoisting machine with electric motor acting as the hoisting machine for a car. A drive unit (frequency converter) is controlling the hoisting machine. An elevator car movement sensor is installed as a motor encoder mounted on the rotating axis of the hoisting machine. The drive unit has a microprocessor, which performs a software that takes care of the following adaptable parameters like elevator drive sequence, e.g. opening the hoisting machine brakes, commanding a current to be fed to the hoisting machine motor, calculating a speed control loop such that the elevator car movement measured with the movement sensor approaches a desired movement profile (velocity reference), etc. Therefore the software includes a state machine evaluation which includes predetermined phases that cause a transition from one phase of the drive sequence to another when the run proceeds. In the end, the result is communicated and correcting actions like amending one of the above parameters can be taken according to the results.

By means of the invention an automatic detection-method for getting the jerk in question under control is realized very cost-effective, i.e. without any further costs of material. It provides a valuable diagnostic and feedback tool before auditing at handover with an elevator comfort analyser. Secondly it provides a valuable condition monitoring tool via KRM and can be used regularly during elevator lifetime. Combined with an electronic balancing check function the invention eliminates trial and error procedures and e.g. enhances automating of the elevator maintenance and condition monitoring.

FIG. 1 shows an example of an acceleration graph which is a run up. The jerk zones j1-j4 and acceleration zone a1 and deceleration zone (d1) are usually defined accurately by the drive parameters. The start jerk (SK) is an undesired acceleration but often present in non-optimally adjusted lifts.

The invention claimed is:

1. A method of eliminating a start kick jerk of an elevator car, the method comprising:
   determining whether the elevator car is in one of a brake opening phase and an acceleration phase of a plurality of phases of an elevator run sequence of the elevator car, the plurality of phases of the elevator run sequence having corresponding states in one or more state machines, the brake opening phase being a phase in which a microcontroller opens brakes associated with a hoisting machine and the acceleration phase being a phase in which a velocity of the elevator car increases after the brakes associated with the hoisting machine are open such that the brake opening phase and the acceleration phase define a start kick of the elevator car, the determining whether the elevator car is in one of the brake opening phase and the acceleration phase including setting a state of the one or more state machines by, measuring movement of the elevator car via one or more of a motor encoder mounted on a rotating axis of the hoisting machine, a linear position sensor configured to read stationary position references mounted in the elevator shaft and an accelerometer associated with the elevator car, analysing the movement of the elevator car to determine whether the elevator car is in one of the brake opening phase and the acceleration phase, and setting the state of the one or more state machines based on a result of the analysing;

measuring, via one or more of a vibration sensor and a sound sensor, vibrations associated with the movement of the elevator car;

filtering, via the one or more state machines, the vibrations associated with the movement of the elevator car such that the one or more state machines automatically disregard the vibrations associated with other ones of the plurality of phases of the elevator sequence excluding the brake opening phase and acceleration phase to generate sensor data associated with the kick start;

determining an amount of sway of the elevator car from the sensor data associated with the start kick;

determining whether the amount of sway is within limits set by criteria;

outputting an indication of whether the amount of sway is within the limits; and correcting control parameters associated with the hoisting machine such that the amount of sway is within the limits.

2. The method according to claim 1, further comprising:
filtering the sensor data based on sounds and vibrations to generate filtered sensor data;
processing the filtered sensor data by applying an algorithm evaluating the amount of sway to generate evaluation results; and
outputting of the evaluation results.

3. The method of claim 1, wherein the determining an amount of sway includes determining an amplitude and direction of the sway.

4. The method of claim 1, further comprising:
storing the amount of sway in a database as historical sway data; and
estimating whether the elevator car should be serviced based on the historical sway data.

5. The method of claim 1, wherein the correcting includes correcting a current value supplied to the hoisting machine at a start of the elevator run sequence.

6. The method of claim 1, wherein the determining determines whether the elevator car is in one of the brake opening phase and the acceleration phase using the one or more state machines and enable signals associated with driving and braking the hoisting machine of the elevator car.

7. The method of claim 1, wherein the linear position sensor is a Controller and Electrification (CE) Door Zone Sensor.

8. A non-transitory computer readable medium having stored therein, a computer program that, when executed, configures a processor to,
determine whether an elevator car is in one of a brake opening phase and an acceleration phase of a plurality of phases of an elevator run sequence of the elevator car, the plurality of phases of the elevator run sequence having corresponding states in one or more state machines, the brake opening phase being a phase in which a microcontroller opens brakes associated with a hoisting machine and the acceleration phase being a phase in which a velocity of the elevator car increases after the brakes associated with the hoisting machine are open such that the brake opening phase and the acceleration phase define a start kick of the elevator car, the processor configured to determine whether the elevator car is in one of the brake opening phase and the acceleration phase by setting a state of the one or more state machines by, measuring movement of the elevator car via one or more of a motor encoder mounted on a rotating axis of the hoisting machine, a linear position sensor configured to read stationary position references mounted in the elevator shaft and an accelerometer associated with the elevator car, analysing the movement of the elevator car to determine whether the elevator car is in one of the brake opening phase and the acceleration phase, and setting the state of the one or more state machines based on a result of the analysing, measure, via one or more of a vibration sensor and a sound sensor, vibrations associated with the movement of the elevator car, filtering, via the one or more state machines, the vibrations associated with the movement of the elevator car such that the one or more state machines automatically disregard the vibrations associated with other ones of the plurality of phases of the elevator sequence excluding the brake opening phase and acceleration phase to generate sensor data associated with the kick start, determine an amount of sway of the elevator car from the sensor data associated with the start kick, determine whether the amount of sway is within limits set by criteria, output an indication of whether the amount of sway is within the limits, correct control parameters associated with the hoisting machine such that the amount of sway is within the limits.

9. The non-transitory computer readable medium of claim 8, wherein the processor is configured to determine an amount of sway by determining an amplitude and direction of the sway.

10. The non-transitory computer readable medium of claim 8, wherein the computer program, when executed, further configures the processor to,
store the amount of sway in a database as historical sway data; and
estimate whether the elevator car should be serviced based on the historical sway data.

11. The non-transitory computer readable of claim 8, wherein the processor is configured to correct a current value supplied to the hoisting motor at a start of the elevator run sequence.

12. The non-transitory computer readable of claim 8, wherein the computer program, when executed, configures the processor to determine whether the elevator car is in one of the brake opening phase and the acceleration phase using the one or more state machines and enable signals associated with driving and braking the hoisting machine of the elevator car.

13. The non-transitory computer readable of claim 8, wherein the linear position sensor is a Controller and Electrification (CE) Door Zone Sensor.

* * * * *